US008635405B2

(12) United States Patent
Nishihara et al.

(10) Patent No.: US 8,635,405 B2
(45) Date of Patent: Jan. 21, 2014

(54) COMPUTATIONAL RESOURCE ASSIGNMENT DEVICE, COMPUTATIONAL RESOURCE ASSIGNMENT METHOD AND COMPUTATIONAL RESOURCE ASSIGNMENT PROGRAM

(75) Inventors: Kosuke Nishihara, Tokyo (JP); Kazuhisa Ishizaka, Tokyo (JP)

(73) Assignee: NEC Corporation, Tokyo (JP)

( * ) Notice: Subject to any disclaimer, the term of this patent is extended or adjusted under 35 U.S.C. 154(b) by 31 days.

(21) Appl. No.: 13/138,354

(22) PCT Filed: Feb. 12, 2010

(86) PCT No.: PCT/JP2010/052026
§ 371 (c)(1),
(2), (4) Date: Sep. 6, 2011

(87) PCT Pub. No.: WO2010/093003
PCT Pub. Date: Aug. 19, 2010

(65) Prior Publication Data
US 2011/0314225 A1 Dec. 22, 2011

(30) Foreign Application Priority Data
Feb. 13, 2009 (JP) ................................. 2009-031346

(51) Int. Cl.
*G06F 13/00* (2006.01)
*G06F 13/28* (2006.01)
(52) U.S. Cl.
USPC .................... 711/119; 711/E12.023; 718/105
(58) Field of Classification Search
USPC ........................... 711/119, E12.023; 718/105
See application file for complete search history.

(56) References Cited

U.S. PATENT DOCUMENTS 4,943,912 A * 7/1990 Aoyama et al. ................. 712/16
5,506,987 A * 4/1996 Abramson et al. ............ 718/103

(Continued)

FOREIGN PATENT DOCUMENTS

JP    9-152976 A    6/1997
JP    9-269903 A    10/1997

(Continued)

OTHER PUBLICATIONS

Kawanabe Masazumi, Dispatching System and Method for Multi-processor System, and Recording Medium Recorded With Dispatching Program, Jul. 8, 1998, NEC Corp, Abstract (1 Page), Detailed Description (7 Pages), Claims (3 Pages).*

(Continued)

*Primary Examiner* — Edward Dudek, Jr.
(74) *Attorney, Agent, or Firm* — McGinn IP Law Group, PLLC

(57) ABSTRACT

In a multi-core processor system, cache memories are provided respectively for a plurality of processors. An assignment management unit manages assignment of tasks to the processors. A cache status calculation unit calculates a cache usage status such as a memory access count and a cache hit ratio, with respect to each task. A first processor handles a plurality of first tasks that belong to a first process. If computation amount of the first process exceeds a predetermined threshold value, the assignment management unit refers to the cache usage status to preferentially select, as a migration target task, one of the plurality of first tasks whose memory access count is smaller or whose cache hit ratio is higher. Then, the assignment management unit newly assigns the migration target task to a second processor handling another process different from the first processor.

19 Claims, 11 Drawing Sheets

(56) References Cited

U.S. PATENT DOCUMENTS

| | | | |
|---|---|---|---|
| 6,078,944 A | * | 6/2000 | Enko et al. .................. 718/105 |
| 2002/0040382 A1 | * | 4/2002 | Ueda ............................. 709/106 |
| 2006/0117218 A1 | * | 6/2006 | Kitajima ........................ 714/10 |

FOREIGN PATENT DOCUMENTS

| | | |
|---|---|---|
| JP | 9-274608 A | 10/1997 |
| JP | 10-207850 A | 8/1998 |
| JP | 3266029 B2 | 3/2002 |
| JP | 2007-316710 A | 12/2007 |
| JP | 2008-191949 A | 8/2008 |

OTHER PUBLICATIONS

Kosuke Nishihara, et al., Kumikomi Multi-core Processor Muke H.264 Video Decoder no Heiretsuka, IEICE Technical Report, vol. 107, No. 150, Jul. 12, 2007, pp. 25-30.

International Search Report (ISR)—(PCT/ISA/210), Jul. 2009 (with partial English translation).

Written Opinion of the International Search Authority (ISA)—PCT/ISA/237, Jul. 2009.

* cited by examiner

1: MULTI-CORE PROCESSOR SYSTEM

Fig. 5

SC:CACHE STATUS INFORMATION

| TASK | CACHE USAGE STATUS | |
|---|---|---|
| | MEMORY ACCESS COUNT | CACHE HIT RATIO |
| | | |
| | | |
| | | |
| | | |
| | | |

Fig. 6

SP:PROCESS STATUS INFORMATION

| PROCESS | COMPUTATION AMOUNT |
|---|---|
| | |
| | |
| | |
| | |

Fig. 11

| MC (mode1) | MC (mode0) | IP (mode1) | IP (mode1) | IP (mode0) |
|---|---|---|---|---|
| MC (mode1) | MC (mode0) | IP (mode1) | IP (mode0) | IP (mode0) |
| MC (mode1) | MC (mode0) | IP (mode0) | IP (mode0) | IP (mode1) |
| MC (mode1) | MC (mode0) | IP (mode0) | IP (mode1) | IP (mode1) |

Fig. 12

| MC (mode1) | MC (mode0) | IP (mode1) | IP (mode1) | IP (mode0) |
| MC (mode1) | MC (mode0) | IP (mode1) | IP (mode0) | IP (mode0) |
| MC (mode1) | MC (mode0) | IP (mode0) | IP (mode0) | IP (mode1) |
| MC (mode1) | MC (mode0) | IP (mode0) | IP (mode1) | IP (mode1) |

COMPUTATIONAL RESOURCE ASSIGNMENT DEVICE, COMPUTATIONAL RESOURCE ASSIGNMENT METHOD AND COMPUTATIONAL RESOURCE ASSIGNMENT PROGRAM

TECHNICAL FIELD

The present invention relates to a technique for appropriately assigning computational resources to processes in a multi-core processor system.

BACKGROUND ART

In recent years, an embedded system has become increasingly sophisticated and is required to operate a large number of applications (processes) concurrently. As a high-end processor for supporting such high functionality, a "multi-core processor" in which a plurality of processors are integrated is used. In the multi-core processor, a cache memory is generally provided with respect to each core (processor).

When a plurality of processes are started in the multi-core processor system, resource contention between the processes occurs. Here, a process is a unit of processing executed, and a single process consists of a plurality of tasks that are parallel executable (task is also called thread; hereinafter it is collectively called "task"). Resources include a processor, a cache memory, a bus bandwidth and the like. The resource contention between processes may cause reduction in system performance. In order to maintain the system performance even when the plurality of processes are started, it is necessary to appropriately distribute resources to the respective processes.

For example, it is necessary to appropriately distribute respective computational resources of the plurality of processors to the plurality of processes. Here, data used by tasks belonging to the same process are considered to be highly relevant with each other. Therefore, improvement in cache use efficiency is expected by assigning a plurality of tasks belonging to the same process to the same processor as much as possible. Conversely, if a plurality of tasks belonging to the same process are dispersively assigned to various processors, the cache use efficiency is reduced and thus the system performance is degraded.

The followings are known as techniques related to assignment of resources in a multi-core processor system.

Patent Literature 1 (Japanese Patent No. 3266029) discloses a dispatching method in a multi-core processor system. The multi-core processor system consists of a plurality of processor groups and a main memory shared by the plurality of processor groups. Each processor group includes a plurality of processors and a cache memory. Any processor in each processor group monitors a hit ratio of the cache memory of the each processor group. If the cache hit ratio is lowered, the processor migrates any task having been executed by the processor group to another processor group where the cache hit ratio is high. As a result, performance degradation as a whole system can be prevented.

Patent Literature 2 (Japanese Patent Publication JP-2007-316710) discloses a technique for improving throughput of a whole system in a multi-core processor system. With regard to each process group, a flag is set depending on degree of cooperative operation between processes (ON=high cooperation degree, OFF=low cooperation degree). In a case of high cooperation degree, reusability of data between the processes is high. Therefore, a process group whose flag is ON is occupied by one processor group. On the other hand, a process group whose flag is OFF is not occupied by a specific processor group but executed dispersively by a plurality of processor groups. As a result, performance of a whole system is improved.

CITATION LIST

Patent Literature

[Patent Literature 1] Japanese Patent No. 3266029
[Patent Literature 2] Japanese Patent Publication JP-2007-316710

SUMMARY OF INVENTION

According to the above-mentioned Patent Literature 1, if the cache hit ratio in a processor group is lowered, any task having been executed by the processor group is migrated to another processor group where the cache hit ratio is high. Here, influence of the migrated task on performance of the migration destination processor group is not taken into consideration. If a task that consumes a large quantity of resources is migrated, the performance of the migration destination processor group is degraded.

An object of the present invention is to provide a technique that can suppress, when a task handled by a processor is migrated to another processor in a multi-core processor system, performance degradation of the migration destination processor.

In an aspect of the present invention, a computational resource assignment device in a multi-core processor system is provided. The multi-core processor system has: a plurality of processors; and a plurality of cache memories respectively utilized by the plurality of processors. The computational resource assignment device has an assignment management unit and a cache status calculation unit. The assignment management unit manages assignment of tasks to the plurality of processors. The cache status calculation unit calculates a cache usage status with respect to each of the tasks. Here, the cache usage status includes at least one of a memory access count and a cache hit ratio. The plurality of processors includes: a first processor handling a plurality of first tasks that belong to a first process; and a second processor handling a second process that is different from the first process. If computation amount of the first process exceeds a predetermined threshold value, the assignment management unit refers to the cache usage status calculated with respect to each of the tasks to preferentially select, as a migration target task, one of the plurality of first tasks whose the memory access count is smaller or whose the cache hit ratio is higher. Then, the assignment management unit newly assigns the migration target task to the second processor.

In another aspect of the present invention, a computational resource assignment method in a multi-core processor system is provided. The multi-core processor system has: a plurality of processors; and a plurality of cache memories respectively utilized by the plurality of processors. The computational resource assignment method includes: (A) assigning tasks to the plurality of processors. Here, the plurality of processors includes: a first processor handling a plurality of first tasks that belong to a first process; and a second processor handling a second process that is different from the first process. The computational resource assignment method further includes: (B) calculating a cache usage status with respect to each of the tasks. Here, the cache usage status includes at least one of a memory access count and a cache hit ratio. The computational resource assignment method further includes: (C) preferentially selecting, if computation amount of the first process exceeds a predetermined threshold value, one of the plurality of first tasks whose the memory access count is smaller or whose the cache hit ratio is higher as a migration target task, by reference to the cache usage status calculated with respect to each of the tasks; and (D) newly assigning the migration target task to the second processor.

In still another aspect of the present invention, a computational resource assignment program that causes a computer to execute computational resource assignment processing in a multi-core processor system is provided. The multi-core processor system has: a plurality of processors; and a plurality of cache memories respectively utilized by the plurality of processors. The computational resource assignment processing includes: (A) assigning tasks to the plurality of processors. Here, the plurality of processors includes: a first processor handling a plurality of first tasks that belong to a first process; and a second processor handling a second process that is different from the first process. The computational resource assignment processing further includes: (B) calculating a cache usage status with respect to each of the tasks. Here, the cache usage status includes at least one of a memory access count and a cache hit ratio. The computational resource assignment processing further includes: (C) preferentially selecting, if computation amount of the first process exceeds a predetermined threshold value, one of the plurality of first tasks whose the memory access count is smaller or whose the cache hit ratio is higher as a migration target task, by reference to the cache usage status calculated with respect to each of the tasks; and (D) newly assigning the migration target task to the second processor.

According to the present invention, it is possible to suppress, when a task handled by a processor is migrated to another processor in a multi-core processor system, performance degradation of the migration destination processor.

BRIEF DESCRIPTION OF DRAWINGS

The above and other objects, advantages and features of the present invention will be more apparent from the following description of certain exemplary embodiments taken in conjunction with the accompanying drawings.

FIG. 5 schematically shows cache status information in the exemplary embodiment of the present invention.

FIG. 6 schematically shows process status information in the exemplary embodiment of the present invention.

FIG. 11 schematically shows an example of division of moving image decoding processing process.

FIG. 12 schematically shows another example of division of moving image decoding processing process.

DESCRIPTION OF EMBODIMENTS

1. Outline

Figure 1:
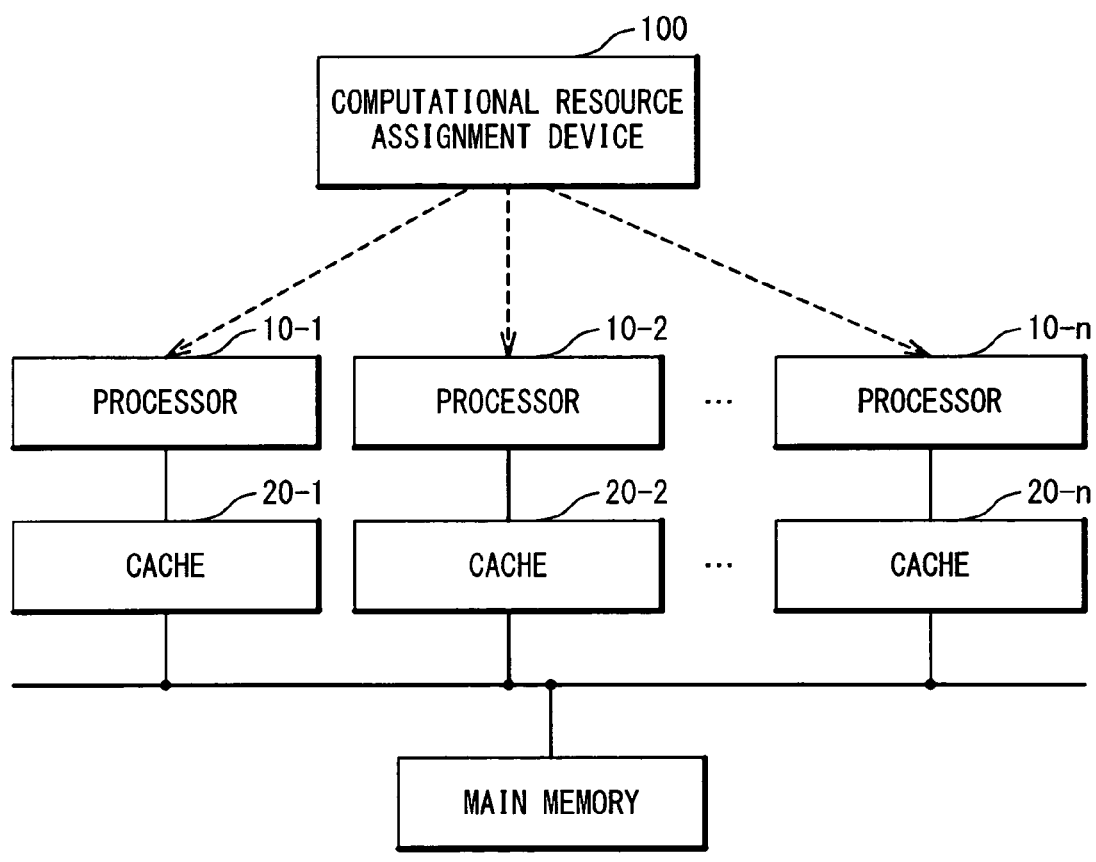
FIG. 1 is a block diagram showing a configuration of a multi-core processor system according to an exemplary embodiment of the present invention.

FIG. 1 is a block diagram showing a configuration of a multi-core processor system 1 according to an exemplary embodiment of the present invention. The multi-core processor system 1 has a plurality of processors 10-1 to 10-$n$ (n is an integer equal to or more than 2), a plurality of cache memories 20-1 to 20-$n$, a main memory 30 and a computational resource assignment device 100. The cache memory 20 is provided with respect to each processor 10. That is, the plurality of cache memories 20-1 to 20-$n$ are respectively provided for the plurality of processors 10-1 to 10-$n$ and respectively utilized by the plurality of processors 10-1 to 10-$n$. The main memory 30 is shared by the plurality of processors 10-1 to 10-$n$.

The computational resource assignment device 100 has a function of appropriately assigning computational resources to respective processes. Here, a process is a unit of processing executed, and a single process consists of a plurality of tasks (processing tasks) that are parallel executable. The computational resource assignment device 100 assigns each task belonging to a process to any of the plurality of processors 10-1 to 10-$n$.

Figure 2:
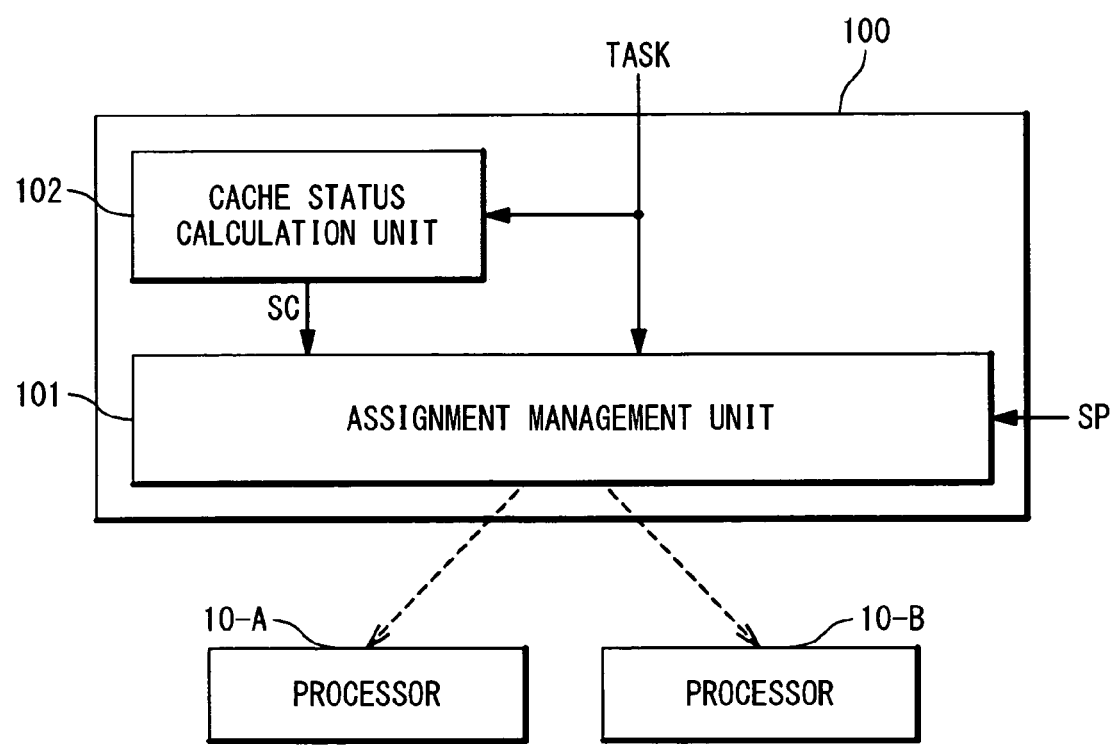
FIG. 2 is a block diagram schematically showing a computational resource assignment device according to the exemplary embodiment of the present invention.

FIG. 2 shows functional blocks of the computational resource assignment device 100 according to the present exemplary embodiment. The computational resource assignment device 100 has an assignment management unit 101 and a cache status calculation unit 102. When a process is started, a plurality of tasks belonging to the process are inputted to the assignment management unit 101 and the cache status calculation unit 102.

The assignment management unit 101 manages assignment of tasks to the respective processors 10-1 to 10-$n$. More specifically, the assignment management unit 101 receives the plurality of tasks and assigns the plurality of tasks to at least one of the processors 10-1 to 10-$n$. Here, in order to improve cache use efficiency, the assignment management unit 101 assigns tasks belonging to the same process to the same processor 10 as much as possible. Furthermore, the assignment management unit 101 migrates (reassigns) a task between the processors 10 depending on the situation, which will be described later.

The cache status calculation unit 102 calculates a "cache usage status" with respect to each of tasks. Here, the cache usage status of a task includes at least one of a "memory access count" and a "cache hit ratio" with regard to the task. Then, the cache status calculation unit 102 generates cache status information SC indicating the cache usage status that is calculated with respect to each task and notifies the assignment management unit 101 of the cache status information SC.

Moreover, the assignment management unit 101 monitors an operation status of each process. More specifically, the assignment management unit 101 externally receives process status information SP indicating computation amount of each process. Then, the assignment management unit 101 compares the computation amount indicated by the process status information SP with a predetermined threshold value. As an example, let us consider a case where a processor 10 (hereinafter referred to as a "first processor 10-A") is handling a plurality of tasks that belong to a process (hereinafter referred to as a "first process"). If the computation amount of the first process exceeds the predetermined threshold value, the following processing is carried out in order to assign more computational resources to the first process.

That is, the assignment management unit 101 selects, as a "migration target task", at least one of the plurality of tasks belonging to the first process. Then, the assignment management unit 101 migrates the migration target task to another processor 10 (hereinafter referred to as a "second processor 10-B") that is handling a process different from the first process. In other words, the assignment management unit 101 newly assigns the migration target task to the second processor 10-B. As a result of such the task reassignment, the computational resource allocated to the first process is increased.

On selecting the migration target task, the assignment management unit 101 refers to the cache status information SC generated by the above-mentioned cache status calculation unit 102. Then, the assignment management unit 101 preferentially selects, as the migration target task, one whose memory access count is smaller or one whose cache hit ratio is higher among the plurality of tasks belonging to the first process. That is, the assignment management unit 101 migrates a task whose memory access count is smaller or a task whose cache hit ratio is higher from the first processor 10-A to the second processor 10-B.

Therefore, cache resource contention in the second processor 10-B being the task migration destination can be suppressed. That is, it is possible to suppress influence of the migrated task on another process being executed by the second processor 10-B. In this manner, according to the present exemplary embodiment, it is possible to increase the computational resource assigned to the first process with suppressing performance degradation of the task migration destination.

Hereinafter, a configuration example and a processing example according to the present exemplary embodiment will be described in more detail.

2. Configuration

Figure 3:
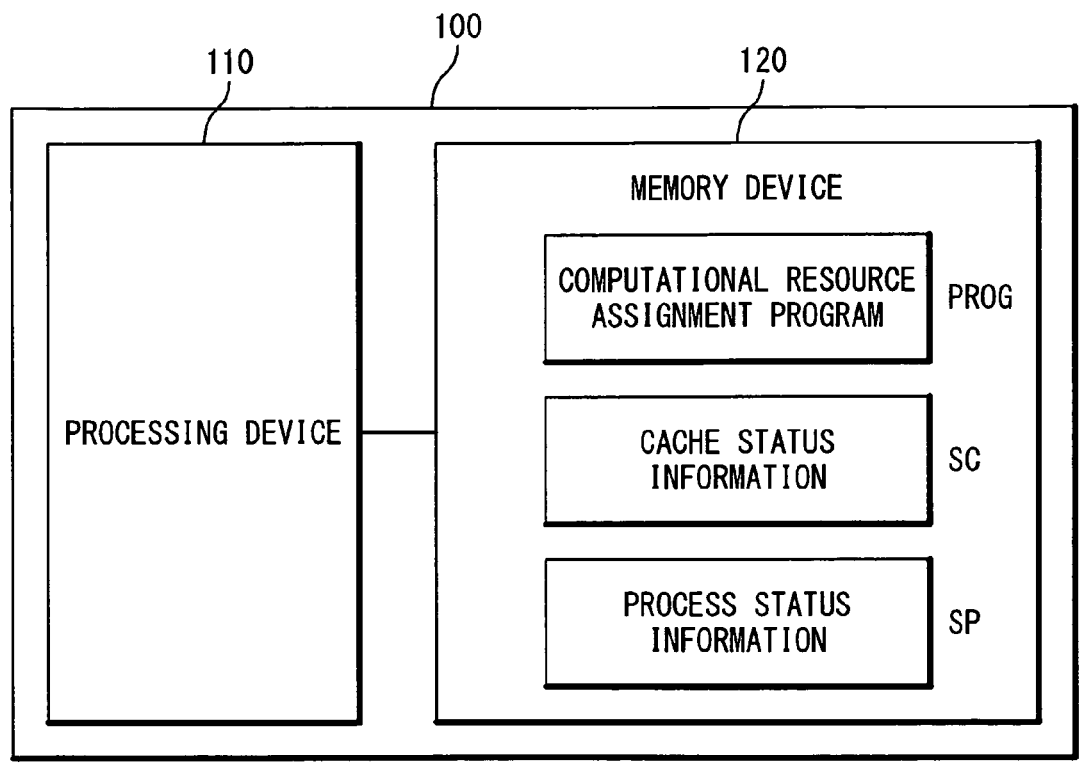
FIG. 3 is a block diagram showing a configuration of the computational resource assignment device according to the exemplary embodiment of the present invention.

FIG. 3 is a block diagram showing a configuration example of the computational resource assignment device 100 according to the present exemplary embodiment. The computational resource assignment device 100 is a computer system having a processing device 110 and a memory device 120. The processing device 110 includes a CPU. The memory device 120 is exemplified by a main memory, a cache memory and a disk. Not only the above-mentioned cache status information SC and process status information SP but also computational resource assignment program PROG and the like are stored in the memory device 120.

The computational resource assignment program PROG is a computer program executed by the processing device 110. The computational resource assignment program PROG may be recorded on a computer-readable recording medium. The processing device 110 executes the computational resource assignment program PROG to provide each function of the computational resource assignment device 100 according to the present exemplary embodiment. That is, the computational resource assignment processing according to the present exemplary embodiment is achieved by the processing device 110 executing the computational resource assignment program PROG.

Figure 4:
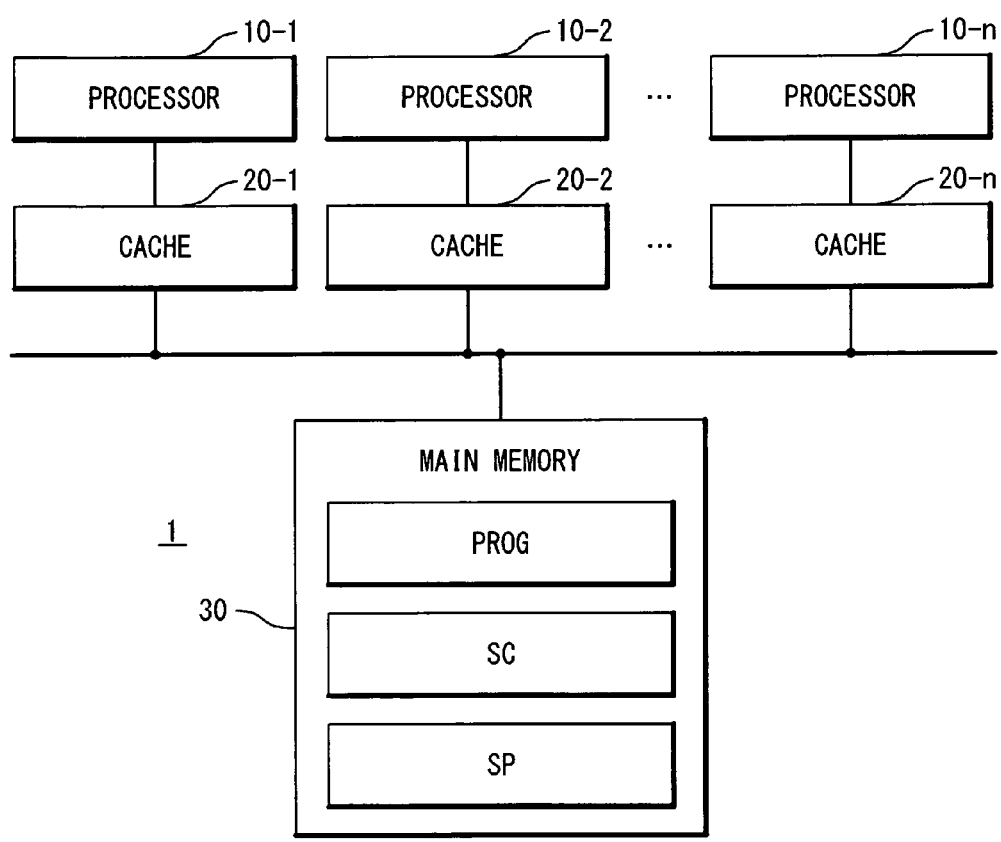
FIG. 4 is a block diagram showing a configuration of the multi-core processor system according to the exemplary embodiment of the present invention.

Typically, each of the plurality of processors 10-1 to 10-n included in the multi-core processor system 1 serves as the processing device 110 of the computational resource assignment device 100. In this case, the main memory 30 is equivalent to the memory device 120, and the computational resource assignment program PROG, the cache status information SC, the process status information SP and the like are stored in the main memory 30 as shown in FIG. 4. Each of the processors 10-1 to 10-n reads the computational resource assignment program PROG from the main memory 30 and executes it. That is, each of the processors 10-1 to 10-n is capable of providing each function of the computational resource assignment device 100 according to the present exemplary embodiment.

FIG. 5 conceptually shows the cache status information SC according to the present exemplary embodiment. The cache status information SC indicates the cache usage status with respect to each task. Here, the cache usage status of a task includes at least one of the "memory access count" and the "cache hit ratio" with regard to the task. Such the cache status information SC is created with respect to each process.

FIG. 6 conceptually shows the process status information SP according to the present exemplary embodiment. The process status information SP indicates computation amount of each process. The process status information SP is externally supplied to the computational resource assignment device 100.

3. Processing 3-1. First Processing Example

Figure 7:
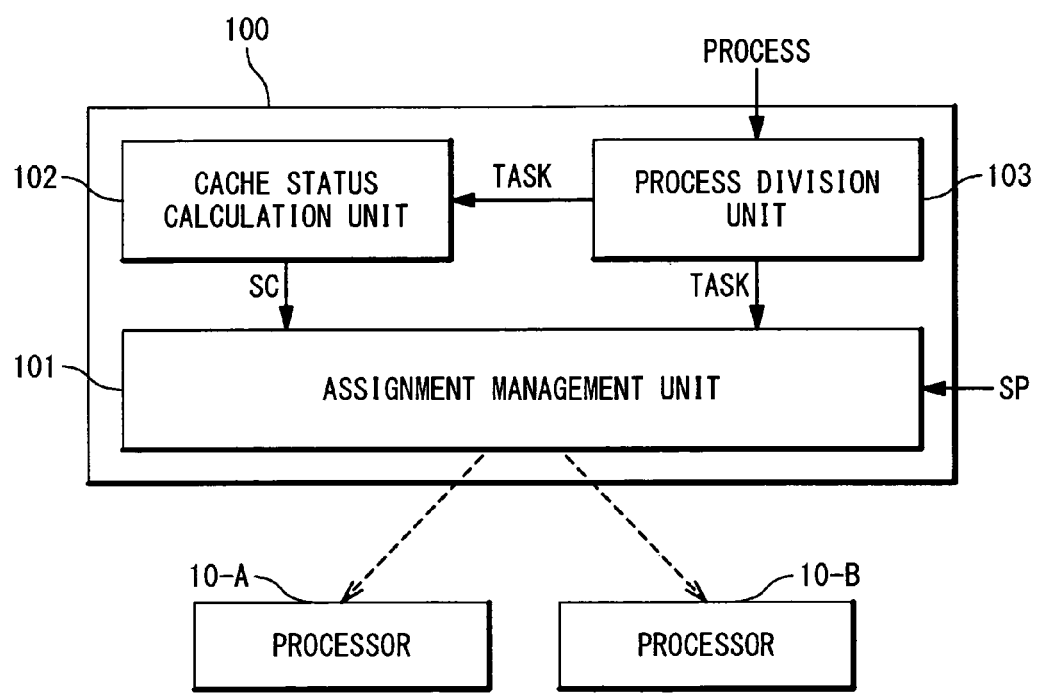
FIG. 7 is a block diagram for explaining computational resource assignment processing according to the exemplary embodiment of the present invention.
Figure 8:
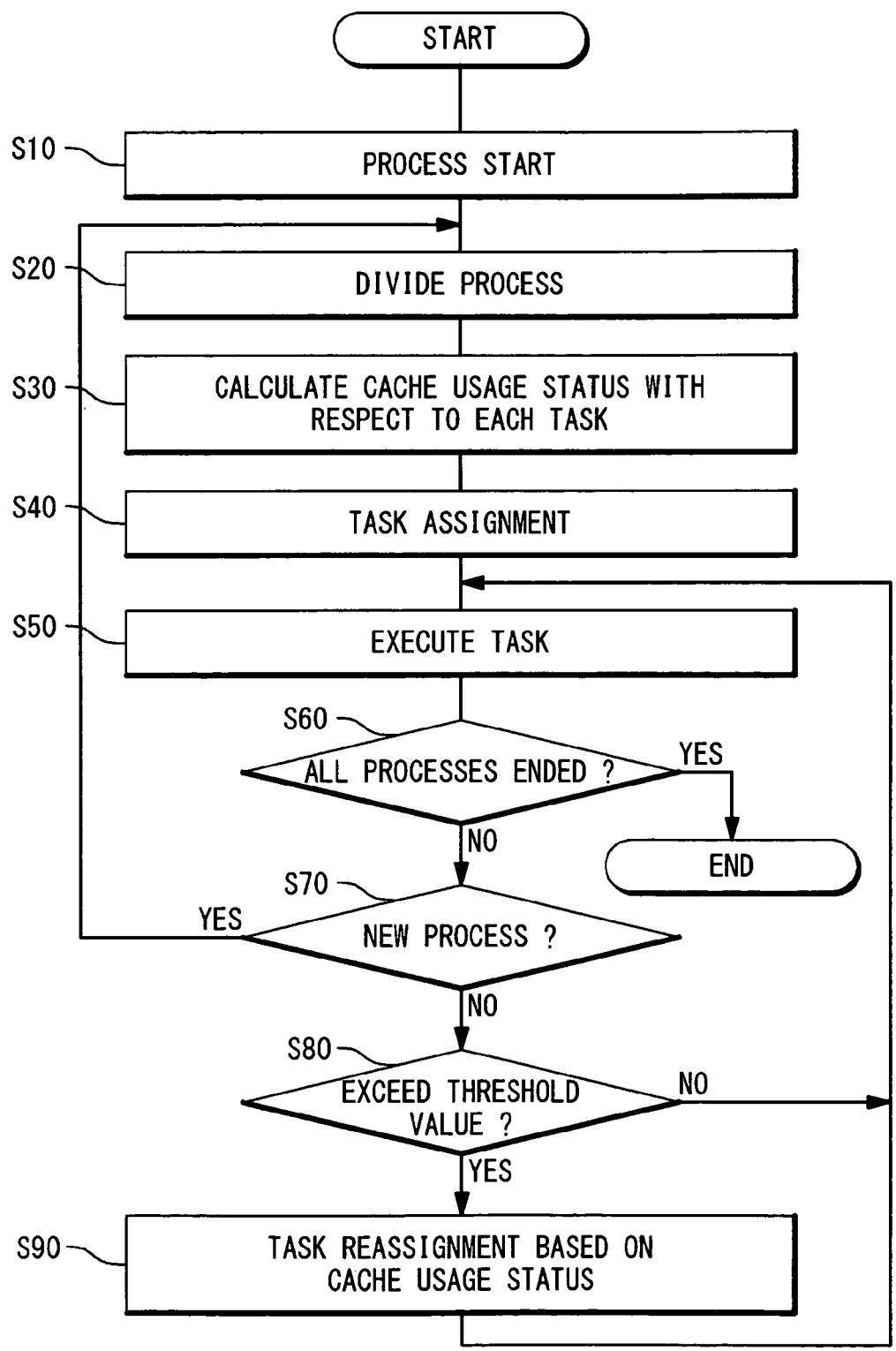
FIG. 8 is a flow chart showing the computational resource assignment processing according to the exemplary embodiment of the present invention.

FIG. 7 is a block diagram for explaining a first processing example by the computational resource assignment device 100 according to the present exemplary embodiment. As shown in FIG. 7, the computational resource assignment device 100 has the assignment management unit 101, the cache status calculation unit 102 and a process division unit 103. The assignment management unit 101, the cache status calculation unit 102 and the process division unit 103 can be achieved by any of the processors 10-1 to 10-n executing the computational resource assignment program PROG. FIG. 8 is a flow chart showing the first processing example.

Step S10:

First, a process is started.

Step S20:

The process division unit 103 divides the started process into a plurality of tasks that are parallel executable. There is no need to consider the cache usage status in the division processing here. An example of the division method is as follows. The process is beforehand described in parallel operations by using parallelization library such as POSIX (Portable Operating System Interface for UNIX), a thread library of Windows (registered trademark), OpenMP and Intel TBB (Threading Building Blocks). At the time of dividing the process, the number of division and policy may be designated. It should be noted that the process division processing may be performed in advance with respect to all executable processes.

Step S30:

The cache status calculation unit 102 calculates the cache usage status (memory access count, cache hit ratio) with respect to each of the tasks generated by the process division unit 103. The cache usage status can be estimated by analyzing processing contents of each task that is revealed at the process division (Step S20). For example, the memory access count and the cache hit ratio can be estimated by analyzing the number of memory access commands by each task and data reference destination addresses thereof. Alternatively, task property is beforehand analyzed with respect to each type, and then the cache usage status may be estimated by checking which type the task generated by the process division is. Alternatively, cache usage history is recorded during task execution, and then the cache usage status may be calculated based on the history. The cache status calculation unit 102 creates the cache status information SC that indicates the cache usage status calculated with respect to each task (refer to FIG. 5).

Step S40:

The assignment management unit 101 receives the plurality of tasks generated by the process division unit 103. Then, the assignment management unit 101 assigns the plurality of tasks to at least one of the processors 10-1 to 10-$n$. Here, data used by tasks belonging to the same process are considered to be highly relevant with each other. Therefore, in order to improve the cache use efficiency, the assignment management unit 101 assigns tasks belonging to the same process to the same processor 10 as much as possible. In other words, the assignment management unit 101 assigns tasks belonging to different processes to different processors 10 as much as possible. The reason is that the cache use efficiency is reduced if different processes are executed by the same processor 10.

Steps S50 to S70:

The processors 10-1 to 10-$n$ execute the respectively assigned tasks (Step S50). If all the processes are ended (Step S60; Yes), the processing is completed. If a new process is started (Step S70; Yes), the processing returns back to Step S20.

Step S80:

The assignment management unit 101 monitors an operation status of each process. More specifically, the assignment management unit 101 receives the process status information SP indicating the computation amount of each process (refer to FIG. 6). Then, the assignment management unit 101 compares the computation amount indicated by the process status information SP with a predetermined threshold value. The threshold value of the computation amount may be given in advance or may be given as an external input at the time of execution. If there is no process whose computation amount exceeds the threshold value (Step S80; No), the processing returns back to Step S50. On the other hand, if the computation amount of any process exceeds the threshold value (Step S80; Yes), the processing proceeds to the following Step S90.

Step S90:

In Step S90, the assignment management unit 101 migrates (reassigns) a task between the processors 10. As an example, let us consider a case where a first processor 10-A is handling a plurality of tasks belonging to a first process, and a second processor 10-B different from the first processor 10-A is handling a second process different from the first process. Here, the computation amount of the first process exceeds the predetermined threshold value.

The assignment management unit 101 selects, as a "migration target task", at least one of the plurality of tasks belonging to the first process. Then, the assignment management unit 101 migrates the migration target task to the second processor 10-B. In other words, the assignment management unit 101 newly assigns the migration target task to the second processor 10-B. As a result of such the task reassignment, the computational resource allocated to the first process is increased. After that, the processing returns back to Step S50.

On selecting the migration target task, the assignment management unit 101 refers to the cache status information SC generated by the above-mentioned cache status calculation unit 102. Then, the assignment management unit 101 preferentially selects, as the migration target task, one whose memory access count is smaller or one whose cache hit ratio is higher among the plurality of tasks belonging to the first process. That is, the assignment management unit 101 migrates a task whose memory access count is smaller or a task whose cache hit ratio is higher from the first processor 10-A to the second processor 10-B.

Therefore, cache resource contention in the second processor 10-B being the task migration destination can be suppressed. That is, it is possible to suppress influence of the migrated task on the second process being executed by the second processor 10-B. In this manner, according to the present exemplary embodiment, it is possible to increase the computational resource assigned to the first process with suppressing performance degradation of the task migration destination.

3-2. Second Processing Example

Figure 9:
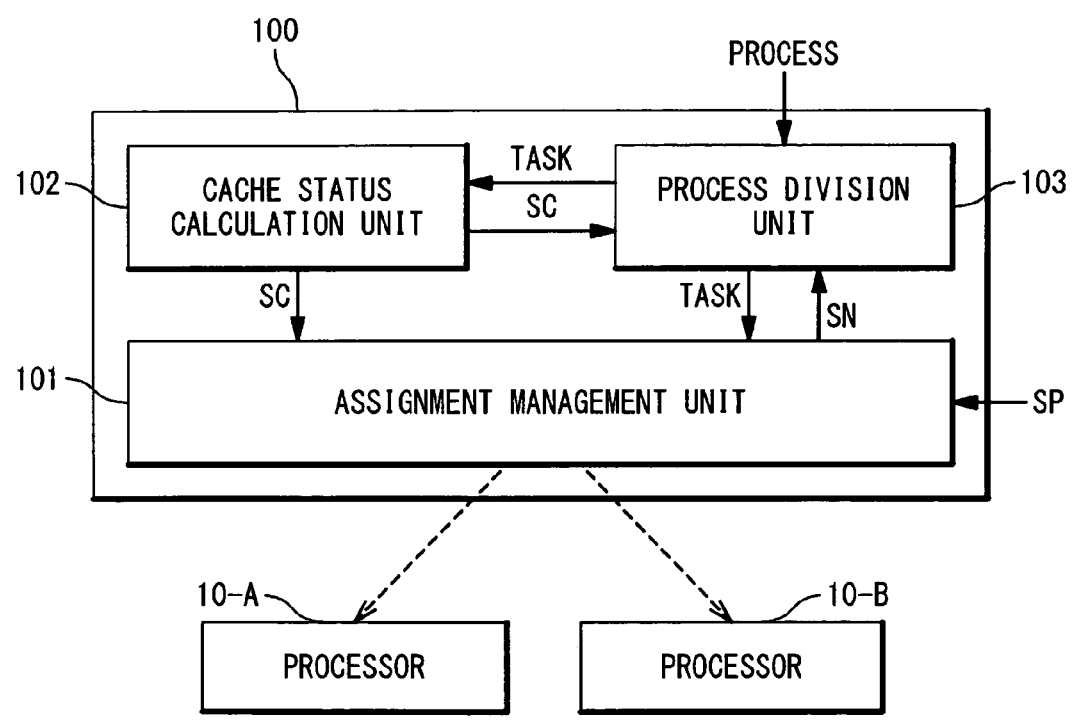
FIG. 9 is a block diagram for explaining a modification example of the computational resource assignment processing according to the exemplary embodiment of the present invention.
Figure 10:
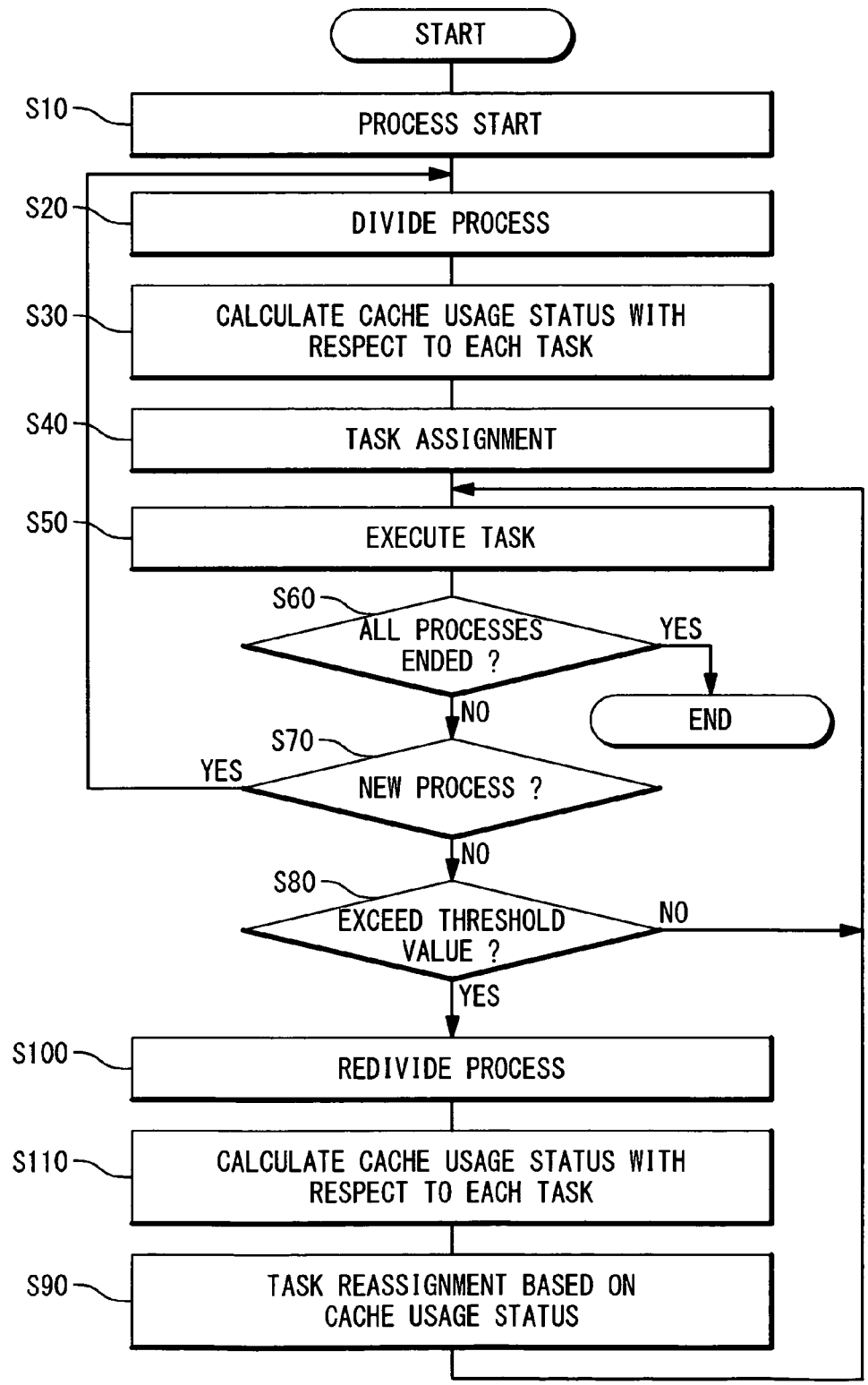
FIG. 10 is a flow chart showing a modification example of the computational resource assignment processing according to the exemplary embodiment of the present invention.

FIG. 9 is a block diagram for explaining a second processing example. FIG. 10 is a flow chart showing the second processing example. An overlapping description with the above-described first processing example will be omitted as appropriate. Steps S10 to S80 are the same as in the case of the first processing example. If the computation amount of the first process exceeds the predetermined threshold value (Step S80; Yes), the processing proceeds to Step S100.

Step S100:

The assignment management unit 101 transmits a notification SN indicating that the computation amount of the first process has exceeded the predetermined threshold value to the process division unit 103. In response to the notification SN, the process division unit 103 performs redivision of the first process. In the redivision processing, the process division unit 103 refers to the cache status information SC that has been generated by the above-mentioned cache status calculation unit 102. Thereby, the process division unit 103 intentionally divides the first process such that the memory access count or the cache hit ratio varies between tasks.

Step S110:

As in the case of Step S30, the cache status calculation unit 102 recalculates the cache usage status (memory access count, cache hit ratio) and updates the cache status information SC.

Step S90:

After the Steps S100 and S110, the Step S90 is performed as in the case of the first processing example. Since the first process is intentionally redivided such that the cache usage status varies remarkably between tasks, the influence of the migrated task on the second processor 10-B can be further reduced.

4. Moving Image Processing

The present exemplary embodiment can be applied, for example, to moving image processing. In this case, at least one of processes in the multi-core processor system 1 is a moving image processing process. As an example of the moving image processing, let us describe below decoding processing of "H.264/MPEG-4 AVC (hereinafter referred to as H.264) method".

The processes in the multi-core processor system 1 include a moving image decoding processing process (first process). The minimum processing unit in the moving image decoding processing is a "macro block", and it is comprised of 16×16 pixels block. For example, in a case of a bit stream of a VGA size (640×480 pixels), one screen (one frame) is comprised of a total of 1200 macro blocks (40 in the horizontal direction, 30 in the vertical direction). The decoding processing includes VLD (Variable Length Decoding), MC (Motion Compensation), IP (Intra Prediction), DF (Deblocking Filter) and so on. The VLD and the DF among them are executed with respect to all the macro blocks. As to the MC and the IP, any one of them is executed with respect to the macro block. That is, the macro blocks can be classified into two types: a "MC type" and an "IP type". Which block type the macro block has is revealed as a result of the VLD.

The process division unit 103 divides such a moving image decoding processing process into a plurality of tasks that are parallel executable (Step S20). The minimum unit for the division is processing with respect to a single macro block. The processing with respect to a single macro block may be set as a single task, but it is not limited to that. Processing with respect to some macro blocks may be collectively set as a single task. For example, IP processing with respect to a line of macro blocks along the horizontal direction may be set as a single task, or MC processing with respect to successive some lines of macro blocks may be set as a single task.

The cache status calculation unit 102 calculates the cache usage status (memory access count, cache hit ratio) with respect to each of tasks generated by the process division unit 103 (Step S30). It should be noted here that the MC, which refers to pixel values of a previously decoded frame different from currently decoded frame, is characterized by a large memory access count and a low cache hit ratio. On the other hand, the IP, which refers to pixel values of peripheral macro blocks in the same frame, is characterized by a high cache hit ratio. Moreover, the memory access count and the cache hit ratio can be different even between the MCs, if a "coding parameter (coding mode)" such as motion compensation pixel fineness (e.g. integer pixel, ½ pixel, ¼ pixel) to be referred to is different. Similarly, the memory access count and the cache hit ratio can be different even between the IPs, if a "coding parameter (coding mode)" such as an intra prediction mode (e.g. vertical direction prediction, horizontal direction prediction) is different. Therefore, the cache status calculation unit 102 estimates the cache usage status of the task based on the "block type" of the macro block and the "coding parameter (coding mode)". For example, reference values of the memory access count and the cache hit ratio due to processing for a single macro block are beforehand set with respect to each combination of the block type and the coding mode. Then, an average or a total of the reference values regarding all the macro blocks handled by a task is calculated as the cache usage status of the task. After that, the cache status calculation unit 102 generates the cache status information SC indicating the cache usage status calculated with respect to each task (refer to FIG. 5).

If computation amount of the moving image decoding processing process exceeds a predetermined threshold value (Step S80; Yes), the process division unit 103 performs redivision of the process (Step S100). In the redivision processing, the process division unit 103 refers to the cache status information SC that has been generated by the cache status calculation unit 102. Thereby, the process division unit 103 divides the moving image decoding processing process such that the memory access count or the cache hit ratio varies between tasks. More specifically, the process division unit 103 collectively sets processing with respect to a plurality of macro blocks having the same block type or the same coding mode as a single task.

FIG. 11 and FIG. 12 show an example of division to tasks with regard to one frame. In FIG. 11 and FIG. 12, processing with respect to a macro block group surrounded by a dashed line corresponds to a single task. In the case of the example shown in FIG. 11, the coding mode is not considered but the block type is considered. More specifically, the MC processing included in the one frame is divided into two tasks each having 2 macro block lines, and the IP processing included in the one frame is divided into four tasks each having a single macro block line. In the case of the example shown in FIG. 12, not only the block type but also the coding mode is taken into consideration. More specifically, the MC processing included in the one frame is divided into two tasks based on the coding mode, and the IP processing included in the one frame is divided, based on the coding mode, into four tasks each having a bracket shape. As a result, the memory access count or the cache hit ratio varies remarkably between the tasks.

After that, the assignment management unit 101 migrates a task whose memory access count is smaller or a task whose cache hit ratio is higher from the first processor 10-A to the second processor 10-B (Step S90).

It should be noted that the decoding processing of the H.264 method has been described as an example of the moving image processing, but it is not limited to that. The present exemplary embodiment is applicable also to moving image decoding/encoding processing for MPEG, JPEG, VC-1 and the like.

While the exemplary embodiments of the present invention have been described above with reference to the attached drawings, the present invention is not limited to these exemplary embodiments and can be modified as appropriate by those skilled in the art without departing from the spirit and scope of the present invention.

This application is based upon and claims the benefit of priority from Japanese patent application No. 2009-031346 filed on Feb. 13, 2009, the disclosure of which is incorporated herein in its entirely by reference.

The invention claimed is:

1. A computational resource assignment device in a multi-core processor system including a plurality of processors, and a plurality of cache memories respectively utilized by said plurality of processors, said computational resource assignment device comprising:
  an assignment management unit configured to manage assignment of tasks to said plurality of processors; and
  a cache status calculation unit configured to calculate a cache usage status with respect to each of said tasks, wherein said cache usage status includes at least one of a memory access count and a cache hit ratio,
  wherein said plurality of processors includes:
    a first processor handling a plurality of first tasks that belong to a first process; and
    a second processor handling a second process that is different from said first process,
  wherein if a computation amount of said first process exceeds a predetermined threshold value, then said assignment management unit refers to said cache usage status calculated with respect to each of said tasks to preferentially select, as a migration target task, a first task of said plurality of first tasks having a cache hit ratio that is greater than an other first task of the plurality of first tasks, and newly assigns said migration target task to said second processor.

2. The computational resource assignment device according to claim 1, further comprising a process division unit, wherein when a process is started, said process division unit divides the started process into a plurality of tasks, and
  wherein said assignment management unit assigns said plurality of tasks generated by said process division unit to at least one of said plurality of processors.

3. The computational resource assignment device according to claim 1, wherein if a computation amount of said first process exceeds a predetermined threshold value, then said assignment management unit refers to said cache usage status calculated with respect to each of said tasks to preferentially select, as a migration target task, a first task of said plurality of first tasks having a cache hit ratio that is greater than the other first tasks of the plurality of first tasks, and newly assigns said migration target task to said second processor.

4. The computational resource assignment device according to claim 1, wherein the cache status calculation unit generates cache status information indicating the cache usage status that is calculated with respect to each task and notifies the assignment management unit of the cache status information.

5. The computational resource assignment device according to claim 4, wherein the assignment management unit receives the cache status information and externally receives process status information indicating a computation amount of a plurality of processes including the first and second processes.

6. The computational resource assignment device according to claim 5, further comprising:
a processing device; and
a memory device which is accessible by the processing device.

7. The computational resource assignment device according to claim 6, wherein the memory device stores the cache status information, the process status information, and a computational resource assignment program which is executable by the processing device to provide a function of the computational resource assignment device.

8. The computational resource assignment device according to claim 7, wherein the multi-core processor system further includes a main memory, and
wherein the main memory serves as the memory device, and a processor of the plurality of processors serves as the processing device.

9. The computational resource assignment device according to claim 8, wherein the plurality of processors reads the computational resource assignment program from the main memory and executes the computational resource assignment program.

10. A computational resource assignment device in a multi-core processor system including a plurality of processors, and a plurality of cache memories respectively utilized by said plurality of processors, said computational resource assignment device comprising:
an assignment management unit configured to manage assignment of tasks to said plurality of processors; and
a cache status calculation unit configured to calculate a cache usage status with respect to each of said tasks, wherein said cache usage status includes at least one of a memory access count and a cache hit ratio,
wherein said plurality of processors includes:
a first processor handling a plurality of first tasks that belong to a first process; and
a second processor handling a second process that is different from said first process,
wherein if a computation amount of said first process exceeds a predetermined threshold value, then said assignment management unit refers to said cache usage status calculated with respect to each of said tasks to preferentially select, as a migration target task, a first task of said plurality of first tasks having a memory access count that is less than an other first task of the plurality of first tasks or having a cache hit ratio that is greater than an other first task of the plurality of first tasks, and newly assigns said migration target task to said second processor,
wherein the computational resource assignment device further comprises a process division unit, and when a process is started, said process division unit divides the started process into a plurality of tasks,
wherein said assignment management unit assigns said plurality of tasks generated by said process division unit to at least one of said plurality of processors, and
wherein if the computation amount of said first process exceeds said predetermined threshold value, then said process division unit performs redivision of said first process, said cache status calculation unit recalculates said cache usage status and then said assignment management unit selects said migration target task.

11. The computational resource assignment device according claim 10, wherein in said redivision, said process division unit refers to said calculated cache usage status to divide said first process such that said memory access count or said cache hit ratio varies between tasks.

12. A computational resource assignment method in a multi-core processor system including a plurality of processors, and a plurality of cache memories respectively utilized by said plurality of processors, said computational resource assignment method comprising:
assigning tasks to said plurality of processors, said plurality of processors including :
a first processor handling a plurality of first tasks that belong to a first process; and
a second processor handling a second process that is different from said first process;
calculating a cache usage status with respect to each of said tasks, wherein said cache usage status includes at least one of a memory access count and a cache hit ratio;
preferentially selecting, if computation amount of said first process exceeds a predetermined threshold value, a first task of said plurality of first tasks having a cache hit ratio that is greater than an other first task of the plurality of first tasks as a migration target task, by reference to said cache usage status calculated with respect to each of said tasks; and
newly assigning said migration target task to said second processor.

13. The computational resource assignment method according to claim 12, further comprising:
dividing, when a process is started, the started process into a plurality of tasks,
wherein said assigning tasks comprises assigning said plurality of tasks generated by said dividing to at least one of said plurality of processors.

14. A computational resource assignment method in a multi-core processor system including a plurality of processors, and a plurality of cache memories respectively utilized by said plurality of processors, said computational resource assignment method comprising:
assigning tasks to said plurality of processors, said plurality of processors including :
a first processor handling a plurality of first tasks that belong to a first process; and
a second processor handling a second process that is different from said first process;
calculating a cache usage status with respect to each of said tasks, wherein said cache usage status includes at least one of a memory access count and a cache hit ratio;
preferentially selecting, if computation amount of said first process exceeds a predetermined threshold value, a first task of said plurality of first tasks having a memory access count that is less than an other first task of the plurality of first tasks or having a cache hit ratio that is greater than an other first task of the plurality of first tasks as a migration target task, by reference to said cache usage status calculated with respect to each of said tasks;

newly assigning said migration target task to said second processor;

dividing, when a process is started, the started process into a plurality of tasks, said assigning tasks comprising assigning said plurality of tasks generated by said dividing to at least one of said plurality of processors; and performing once again said dividing with regard to said first process and performing once again said calculating said cache usage status, if the computation amount of said first process exceeds said predetermined threshold value, wherein said selecting said migration target task is executed after said performing once again said calculating said cache usage status.

15. The computational resource assignment method according to claim 14, wherein in said performing once again said dividing with regard to said first process, said calculated cache usage status is referred to and said first process is divided such that said memory access count or said cache hit ratio varies between tasks.

16. A non-transitory recording medium on which a computational resource assignment program is recorded, the computational resource assignment program causing a computer to execute computational resource assignment processing in a multi-core processor system, wherein said multi-core processor system includes a plurality of processors, and a plurality of cache memories respectively utilized by said plurality of processors, said computational resource assignment processing comprising:

assigning tasks to said plurality of processors, said plurality of processors comprising:
a first processor handling a plurality of first tasks that belong to a first process; and
a second processor handling a second process that is different from said first process;

calculating a cache usage status with respect to each of said tasks, wherein said cache usage status includes at least one of a memory access count and a cache hit ratio;

preferentially selecting, if computation amount of said first process exceeds a predetermined threshold value, a first task of said plurality of first tasks having a cache hit ratio that is greater than an other first task of the plurality of first tasks as a migration target task, by reference to said cache usage status calculated with respect to each of said tasks; and newly assigning said migration target task to said second processor.

17. The recording medium according to claim 16, wherein said computational resource assignment processing further comprises dividing, when a process is started, the started process into a plurality of tasks, and wherein said assigning tasks comprises assigning said plurality of tasks generated by said dividing to at least one of said plurality of processors.

18. A non-transitory recording medium on which a computational resource assignment program is recorded, the computational resource assignment program causing a computer to execute computational resource assignment processing in a multi-core processor system, wherein said multi-core processor system includes a plurality of processors, and a plurality of cache memories respectively utilized by said plurality of processors, said computational resource assignment processing comprising:

assigning tasks to said plurality of processors, said plurality of processors comprising:
a first processor handling a plurality of first tasks that belong to a first process; and
a second processor handling a second process that is different from said first process;

calculating a cache usage status with respect to each of said tasks, wherein said cache usage status includes at least one of a memory access count and a cache hit ratio;

preferentially selecting, if computation amount of said first process exceeds a predetermined threshold value, a first task of said plurality of first tasks having a memory access count that is less than an other first task of the plurality of first tasks or having a cache hit ratio that is greater than an other first task of the plurality of first tasks as a migration target task, by reference to said cache usage status calculated with respect to each of said tasks;

newly assigning said migration target task to said second processor;

dividing, when a process is started, the started process into a plurality of tasks, said assigning tasks comprising assigning said plurality of tasks generated by said dividing to at least one of said plurality of processors; and performing once again said dividing with regard to said first process and performing once again said calculating said cache usage status, if the computation amount of said first process exceeds said predetermined threshold value, wherein said selecting said migration target task is executed after said performing once again said calculating said cache usage status.

19. The recording medium according to claim 18, wherein in said performing once again said dividing with regard to said first process, said calculated cache usage status is referred to and said first process is divided such that said memory access count or said cache hit ratio varies between tasks.

* * * * *